United States Patent [19]

Flesher

[11] Patent Number: 5,158,324
[45] Date of Patent: Oct. 27, 1992

[54] PROTECTIVE COVER FOR VEHICLES

[76] Inventor: Robert W. Flesher, 99 Dunkirk Rd., Baltimore, Md. 21212

[21] Appl. No.: 599,727

[22] Filed: Oct. 19, 1990

[51] Int. Cl.⁵ ............................................. B62D 25/00
[52] U.S. Cl. .................................. 280/770; 293/128; 428/900
[58] Field of Search ................ 280/770, 850; 296/136, 296/95.1; 428/900, 423.1, 100; 293/128

[56] References Cited

U.S. PATENT DOCUMENTS

| | | | |
|---|---|---|---|
| 3,665,355 | 5/1972 | Sasaki et al. | 296/136 |
| 4,219,218 | 8/1980 | Waldon | 280/770 |
| 4,376,546 | 3/1983 | Gucione et al. | 296/136 |
| 4,529,660 | 7/1985 | Heim | 428/423.1 |
| 4,663,874 | 5/1987 | Sano et al. | 428/900 |
| 4,734,312 | 3/1988 | Sugiyama | 296/136 |

FOREIGN PATENT DOCUMENTS 246268 1/1926 United Kingdom ................ 296/136

*Primary Examiner*—David M. Mitchell
*Attorney, Agent, or Firm*—Rodger H. Flagg

[57] ABSTRACT

A protective cover for vehicles is disclosed, wherein a flexible material having a magnetic base portion with a resilient top portion laminated thereto is cut in segments to conform to a portion of an exterior body surface of a vehicle. More than one segment is placed adjacent to each other in side by side relation to provide a protective cover for a vehicle. The vehicle may be any known type of vehicle, and the protective cover may be cut to cover any portion of the vehicle where protection is desired. Indicia may be disposed upon at least one segment of the protective cover, and the resilient top portion is preferably visually distinct from magnetic base portion for ease of assembly. A plurality of spaced grooves are provided across the magnetic base portion of each segment so that moisture may pass beneath the flexible material, while the segments are removably secured to the vehicle.

14 Claims, 2 Drawing Sheets

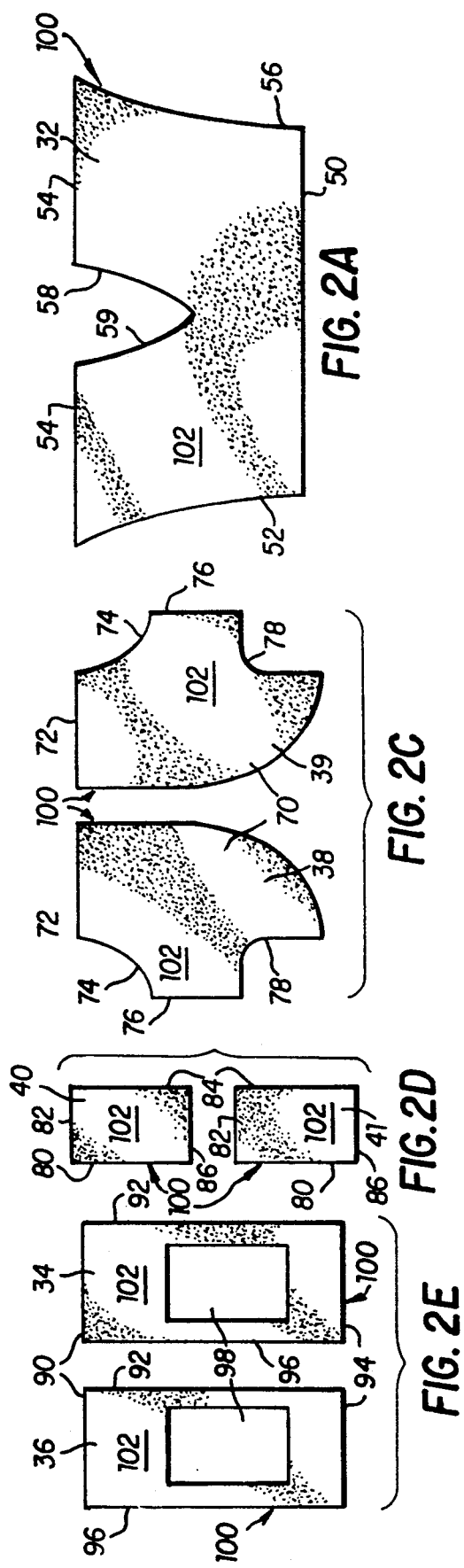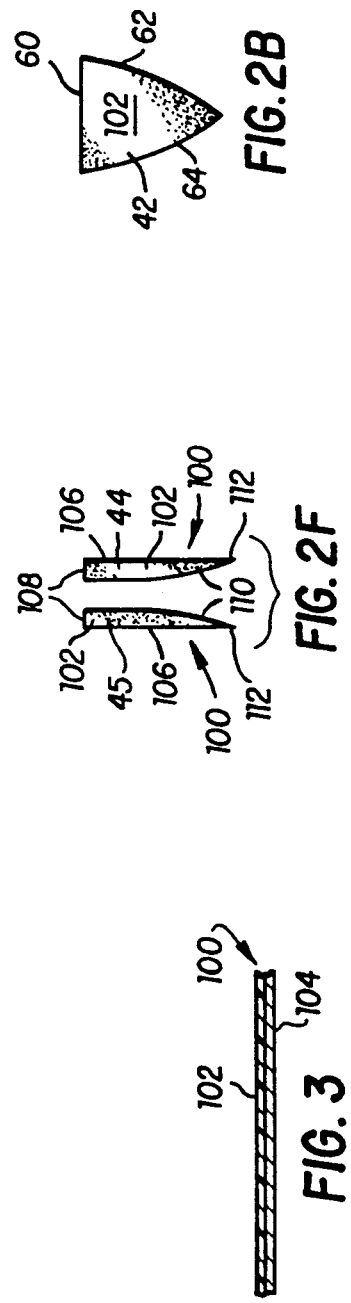

PROTECTIVE COVER FOR VEHICLES

BACKGROUND OF THE INVENTION

Front end covers for vehicles, provide extra protection from paint damage caused by flying stones, chips and other airborne debris, while driving. They also provide a distinctive appearance, which tends to set one car apart from another, and allows the owner to customize their vehicle.

Traditionally, a front end cover, or "bra" is made of leather or flexible plastic, such as vinyl. The front end covers are held in place with straps, tie downs, springs, grommets, clips or other apparatus, which are used to hold the covers in place under the considerable wind forces generated when a vehicle is traveling at high speed.

If the front end cover is not tightly held in place, the wind may buffet the cover, causing the means of attachment to scrape across the painted finish of the vehicle, eventually damaging the paint. Dust and small particles adhere to the cover, providing an abrasive contact between the cover and the vehicle paint, as the cover flaps in the wind. Where the cover is subjected to moisture, such as during rain or snow, the moisture often remains trapped beneath the cover, providing an area of high humidity beneath the cover which tends to leach and otherwise discolor the painted finish. The complicated nature of attachment of a conventional vehicle bra is time consuming to install or remove, which discourages removal of the bra after each rain, which should be done to properly dry the bra.

U.S. Pat. No. 4,376,546 is representative of front end shields for vehicles, which are presently in use, and which require straps, hooks or other apparatus to secure the shield to the vehicle wheel well.

U.S. Pat. No. 4,663,874 discloses a magnetically attachable sign for vehicles, having small trough indentations to avoid air pockets or bulges upon installation.

U.S. Pat. No. 4,529,660 discloses a laminated liner material formed with a top surface of abrasion resistant material and a bottom surface of flexible plastic impregnated with a magnetic material.

SUMMARY OF THE INVENTION

Therefore, what is needed is a protective cover for vehicles which is easy to install and remove;, requires no external retention means such as straps, tie downs, etc; is attractive in appearance; and provides an aerodynamic profile complementary to the external profile of the vehicle to which it is attached; and may be designed for use with a specific vehicle, at a specific location on that vehicle.

These objects and advantages are accomplished by the present invention, wherein a protective cover is formed of more than one segment of flexible material, each segment having a particulate ferromagnetic sheet magnetic base portion and a resilient top portion. Each segment is cut to conform to the physical characteristics of the external body surface of the vehicle, and is secured by the magnetic attraction of the magnetic base portion to the magnetically attractive body portion of the vehicle on which the protective cover is to be installed.

Each segment is preferably cut to adjoin an adjacent segment in side by side relation, providing a protective cover adapted to cover a selected portion of the vehicle body, such as the front portion of the hood and fenders.

Since no straps, tie downs, etc. are required to secure the protective cover to the vehicle, any magnetically attractive portion of the vehicle may be used to secure a segment of the flexible material thereto, to provide protection against knocks, bumps, flying debris, etc.

Cutouts may be provided in one or more segments to provide clearance for a mechanical component, such as headlight covers, brackets, medallions, hood clamps, handles, locks, etc.

The segments of flexible material may be stored or shipped flat, and contoured to conform to the external profile of the vehicle upon installation.

The resilient top portion provides excellent protection against small flying stones, chips, or other airborne debris. The top portion preferably has a surface which visibly differs from the magnetic base portion for ease of orientation at assembly. Designs, patterns, colors, or other indicia may be printed or otherwise marked upon the flexible material.

The above mentioned features and objects of this invention, and the manner of attaining them will be best understood by reference to the following description of an embodiment of the invention, when considered in conjunction with the accompanying drawings.

BRIEF DESCRIPTION OF THE DRAWINGS

FIG. 2A is a view of one segment cut to cover a portion of the vehicle hood.

FIG. 2B is a view of one segment cut to cover a wind scoop on the vehicle hood.

FIG. 2C is a view of segments used on the left and right side portion of the front fenders.

FIG. 2D is a view of segments used on the headlight covers.

FIG. 2E is a view of segments cut for the top portion of the front fender.

FIG. 2F is a view of segments cut for the side of the air scoop disposed upon the vehicle hood.

FIG. 3 is a cross sectional view of the preferred flexible material.

DESCRIPTION OF THE PREFERRED EMBODIMENTS

Figure 1:
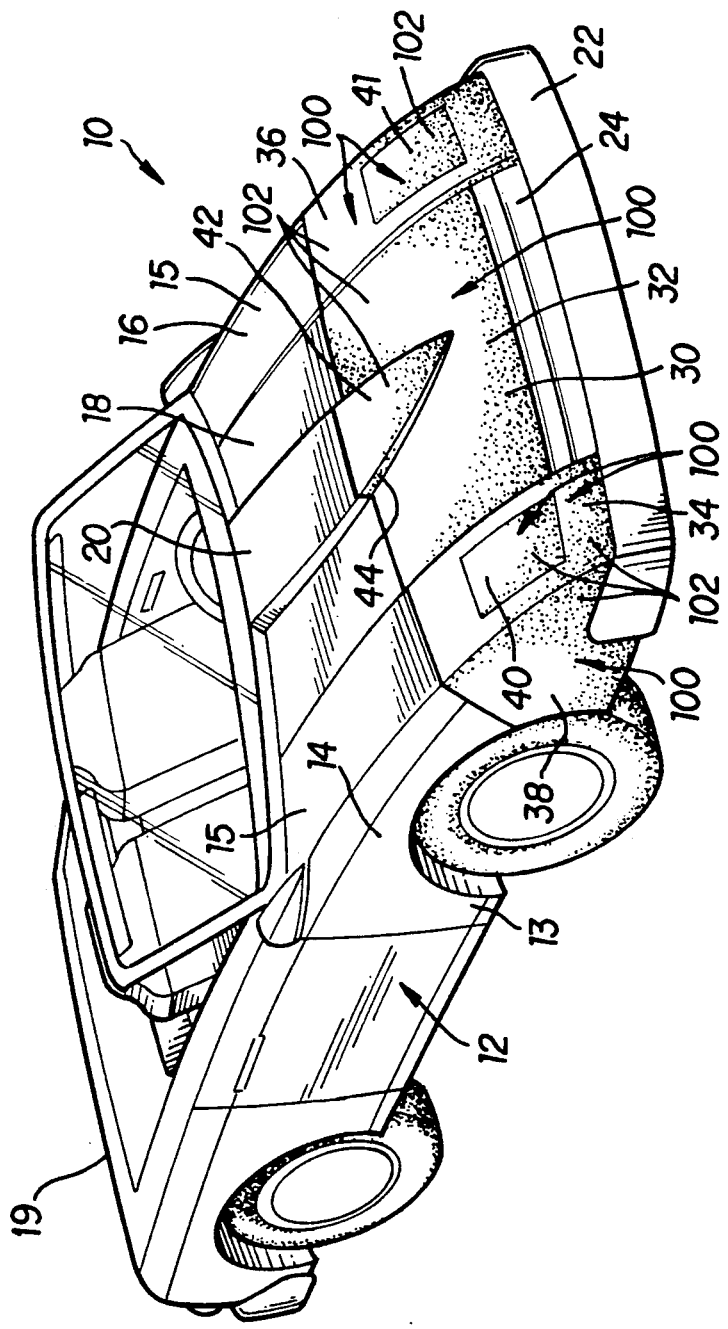
FIG. 1 is a perspective view of a sports vehicle, with the protective cover segments installed in side by side relation upon the hood and fenders.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows a vehicle, such as a sports car 10, having a magnetically attractive vehicle body 12. The vehicle 10 has a vehicle side portion 13, and a front fender side portion 14. The vehicle 10, also has a passenger top fender portion 15, and a driver top fender portion 16. A hood or bonnet, 18 is secured to the vehicle 10, between the top fender portions 15, 16. An air scoop or sculptured hood portion 22 may be provided on the vehicle hood 18.

A front bumper 22 extends across the lower front portion of the vehicle 10 and may wrap around a portion of the front fender side portion 14. A grill 24 may extend above the bumper in proximity to the vehicle hood 18, to provide access for air to enter the engine compartment located beneath the vehicle hood 18.

The protective cover 30 of this invention may be readily adapted for use on sports cars, sedans, trucks, pickups, construction vehicles, boats, planes, etc. The term vehicle, as hereinafter used, is intended to cover all forms of vehicles, including those referenced above.

The protective cover 30 preferably covers the front portion of the vehicle 10, providing protection against flying debris. It is within the scope of this invention to also disclose a protective cover 30 adapted to cover other portions of a vehicle 10, such as the sides 13 or rear portion 19 of the vehicle 10.

The protective cover 30 is formed of more than one segment 26 of flexible material 100, which is cut to the particular profile of an external body portion of a particular vehicle 10.

One segment 32 may be cut to conform to the vehicle hood 18, as shown in FIG. 2A. Another segment 34 may be cut to conform to the passenger side top fender portion 15. Yet another segment 36 may be cut to conform to the driver side top fender portion 16, as shown in FIG. 2E.

Cutouts 98 may be provided, as shown in segments 34, 36 for mechanical features, such as headlight covers, etc. Headlight covers may also be protected by segments 40, 41 shown in FIGS. 1 and 2D. The driver top and side fender portions 16, 14 may also be protected with cover segments 36, 39 as shown in FIGS. 1, 2C and 2E.

Where the vehicle 10 sides 14 are sharply defined, the adjoining segments 34, 38 and 34, 39 may come together in side by side relation along the area which is sharply defined, as shown in FIG. 1. However, where the transition between the top and sides is more rounded, or more gently contoured, one segment 28 may be used to cover both the top and side portions of the fender (not shown).

Particular vehicle design contours, such as an air scoop 20 on vehicle hood 18, may be easily accommodated with the present invention through the use of various segments 42, 44 shown in FIGS. 1, 2B and 2F, without unsightly ripples or bulges along the area of transition. Where the area of transition around air scoop 20 is more rounded, or eliminated, the hood segment 32 may be cut as one piece, without cutouts 58, 59 shown in FIG. 2A.

As shown in FIG. 2A, the hood segment 32 comprises a bottom edge cut to conform to the profile of the grill 24. Left and right sides 52, 56 are cut to conform to the left and right sides of top fender portions 15, 16 adjacent to hood 18. The top edge 54 is cut to provide a transition between segment 32 and the uncovered portion of hood 18. Where an air scoop is present, as shown in FIG. 1, a suitable cutout 58, 59 will provide relief without causing wrinkles, bulges or air pockets to form beneath segment 32.

As shown in FIG. 2B, a segment 42 may be cut to conform to the top portion of the air scoop 20. If desired, additional segments 44, 45 may be cut to conform to the vertical offset between hood 18 and air scoop 20, as shown in FIG. 2F.

FIG. 2C shows the left and right side fender segments 38, 39, cut to conform to the vehicle front side fender 14. Cut 70 follows the contour between the vehicle front side 14 and the vehicle fender top portions 15, 16. Left and right sides 38, 39 are mirror images, as the flexible material 28 includes a magnetic base portion 104 and a resilient top portion 102. Segments 38, 39 may be easily cut at the same time by joining the magnetic base portions together prior to cutting.

The back edge 72 of side fender segments 38, 39 is cut to provide a transition between segments 38, 39 and the uncovered side fender portions 14. Side 74 is cut to conform to the side fender 14 wheel well. Side 78 is cut to conform to the fender 22 portion which wraps around the front of the vehicle.

Referring now to FIG. 2D, protective segments 40, 41 may be adapted to cover the headlight covers, to provide a smooth appearance when the covers are open or closed. Since protective segments 40, 41 are not connected to top fender portions 34, 36, they are fee to move with the headlight covers, eliminating the need for removal of portions of the bra to expose the headlights.

Where headlight covers are not used, the area 40, 41 defined by the headlights is left uncovered. Sides 80, 82, 84 and 86 are cut to conform to the profile of the headlight covers 40, 41, and cutouts 98 may be rounded to suit individual vehicle design.

FIG. 2E shows the vehicle top fender 15, 16 cover segments 34, 36. As previously noted, cutouts 98 may be provided to allow headlights or headlight covers to be uncovered, according to particular vehicle 10 design requirements. The forward side 94 of top fender segments 34, 36 is preferably cut to conform to the configuration of the vehicle bumper 22 as shown in FIG. 1. The left and right sides, 92, 96 of top fender segments 34, 36 are cut to conform to respective top fender portions 15, 16 to provide a transition between hood 18 sides 52, 56 and side 70 of side fender segments 38, 39.

While the above description is directed to a sports vehicle 10, shown in FIG. 1, it is well within the scope of this disclosure adapt this protective cover 30 apparatus, to conform to a wide variety of vehicle 10 styles and types, or to adapt this protective cover 30 for use on other locations on a vehicle 10, such as the sides 13 or back 19 of a vehicle 10, to provide additional protection for these areas.

FIG. 3 is a cross sectional view of the preferred flexible material 100, having a resilient top portion 102 and a magnetic base portion 104. The magnetic base portion is preferably a thermoplastic material having a permanent magnet base portion 104 which may be double polarized. B. F. Goodrich is marketing a similar material under the trade name KOROSEAL.

The magnetic base portion 104 of the flexible material 100 is preferably from 0.01 to 0.18 inches thick and is preferably made of barium ferrite bound with 8 to 20 percent of a synthetic elastomeric binder, such as rubber. The resilient top portion 102 is preferably a vinyl material, having a thickness from 0.001 to 0.18 inches.

The magnetic base portion 104 is preferably permanently magnetized with both poles on the side away from the resilient top portion 102. The resilient top portion 102 is laminated to the magnetic base portion 104 with suitable adhesive.

The resilient top portion may be any color. For example, the resilient top portion 102 may be a matte black finish, or a bright neon color, to suit design preference and intended use.

The composite, flexible and resilient material 100 may be die cut, knife cut, strip cut, routed, laser cut, water jet cut, etc. to suit manufacturing preference. The resilient top portion 102 may be marked by screen printing, hot stamping, thermography, hand lettering, etc. to provide distinctive indicia thereon.

For example, the vehicle name, Company name, Sponsor's name or logo may be impressively displayed upon the protective cover 30.

The magnetic base portion 104 of the protective cover 30 should provide sufficient holding power to ensure contact of the magnetic base portion 104 with the magnetically attractive surface of the vehicle 10, under normal driving speeds and wind conditions.

The flexible material segments 28 may be stored or shipped flat, and adapted to conform to the three dimensional vehicle body profile upon assembly. At assembly, one edge of the segment 28 is aligned with a complimentary surface on the vehicle, such as the edge of a body panel, and contact is made between the magnetic base portion 104 and the vehicle surface. Once aligned and attached, the remaining portion of segment 28 may be unrolled, until contact is made between the entire magnetic base portion 104 and the portion of the vehicle 10 intended to be covered by the segment 28. In this manner, each segment 28 of flexible material 100 is releasably secured to a respective vehicle 10 body portion.

To remove the protective cover 30, each segment 28 is peeled off, starting at any edge of any segment 28, and pulling the segment away from the vehicle 10 body. Since there are no straps, catches, clips, etc. attached to the protective cover, the individual segments 28 may be stored or shipped flat in a minimum of space.

Therefore, while this invention has been described with reference to a particular embodiment, it is to be understood that modifications may be made without departing from the spirit of the invention or from the scope of the following claims.

INDUSTRIAL APPLICABILITY

This invention is directed to a protective cover for vehicles, wherein a flexible material with a magnetic base portion and a resilient top portion, is cut into more than one segment to conform to a complex exterior body surface of a vehicle.

I claim:

1. An apparatus for protectively covering at least a portion of a magnetically attractive, exterior body surface of a vehicle, which comprises:

a protective cover formed of more than one segment of a flexible material, each segment having a sheet magnetic base portion of a first color, and a resilient top portion of a second color; and each segment is configured to conform to the physical characteristics of at least one curved portion of the exterior vehicle body surface and to abut at least one adjacent segment in side by side relation; with the magnetic base portion of each segment having the first color positioned against the painted surface of the vehicle, and with the outwardly facing resilient top portion having the second color facing outwardly for ease of orientation during installation.

2. The apparatus of claim 1, wherein selected indicia is disposed upon the resilient top portion of at least one segment of the flexible material which is releasably secured to a portion of the vehicle body by magnetic attraction.

3. The apparatus of claim 1, wherein at least one cutout is provided in at least one flexible material segment to provide clearance for a mechanical component mounted upon the vehicle body in proximity to the protective cover.

4. The apparatus of claim 1 wherein the vehicle has a hood and front fenders, and at least a portion of the vehicle hood and front fenders is covered with pre-cut segments of the flexible material, which are placed upon selected portions of the vehicle hood and front fenders in side by side relation to form a protective body cover thereon.

5. The apparatus of claim 1, wherein the flexible material segments are pre-cut in strips of uniform width and positioned upon the exterior surface of the vehicle body at assembly, with adjoining segments placed in side by side relation to form a substantially continuous protective body cover over at least a portion of the exterior surface of the hood and front fender portions of the vehicle.

6. The apparatus of claim 1, wherein the vehicle has a grill and bumper, and at least one segment of the flexible material is configured to conform to the outer profile of the vehicle grill and bumper.

7. The apparatus of claim 1, wherein the flexible material comprises a magnetic base portion 0.01 to 0.12 inches thick, with a resilient top portion 0.001 to 0.18 inches thick laminated thereto.

8. An apparatus for protectively covering at least a portion of a magnetically attractive, exterior body surface of a vehicle having a grill and a front bumper, which comprises:

a protective cover formed of more than one segment of a flexible material, each segment having a sheet magnetic base portion of a first color, and a resilient top portion of a second color; and each segment configured to conform to the physical characteristics of at least one curved portion of the exterior vehicle body surface and to abut at least one adjacent segment in side by side relation; and at least one segment of the flexible material is configured to conform to the outer profile of the grill; with the magnetic base portion of each segment having the first color positioned against the painted surface of the vehicle, and with the outwardly facing resilient top portion having the second color facing outwardly.

9. The apparatus of claim 8, wherein at least one cutout is provided in at least one segment of the flexible material to provide clearance for at least one mechanical component mounted upon the vehicle body in proximity to the protective cover.

10. The apparatus of claim 8, wherein the vehicle has a hood and front fenders, and at least a portion of the hood and front fenders are covered with pre-cut segments of the flexible material, which are placed thereon in side by side relation to form a protective body cover thereon.

11. The apparatus of claim 8, wherein the flexible material segments are pre-cut in strips of uniform width and positioned upon the vehicle body at assembly, with adjoining segments placed in side by side relation to form a substantially continuous protective body cover over at least a portion of the exterior body surface of the vehicle.

12. The apparatus of claim 8, wherein the flexible material comprises a magnetic base portion 0.01 to 0.12 inches thick, with a resilient top portion 0.001 to 0.18 inches thick laminated thereto.

13. A protective cover apparatus for the exterior body surface of a vehicle having magnetically attractive hood and fender portions, which comprises:

a protective cover formed of more than one segment of a flexible material, each segment having a sheet magnetic base portion of a first color, and a resilient top portion of a second color; and each segment is configured to conform to the physical characteristics of at least one curved portion of the exterior vehicle body surface and to abut at least one adjacent segment in side by side relation; with the magnetic base portion of each segment having the first color positioned against the painted surface of the vehicle, and with the outwardly facing resilient top portion having the second color facing outwardly for ease of orientation; and a cutout is provided in at least one segment to provide clearance for a mechanical component mounted upon the vehicle body in proximity to the protective cover.

14. The apparatus of claim 13, wherein the flexible material comprises a magnetic base portion 0.01 to 0.12 inches thick, with a resilient top portion 0.001 to 0.18 inches thick laminated thereto.

* * * * *